Feb. 22, 1966
C. E. HOUSE
3,236,483
TILTING SUPPORT
Filed June 9, 1964
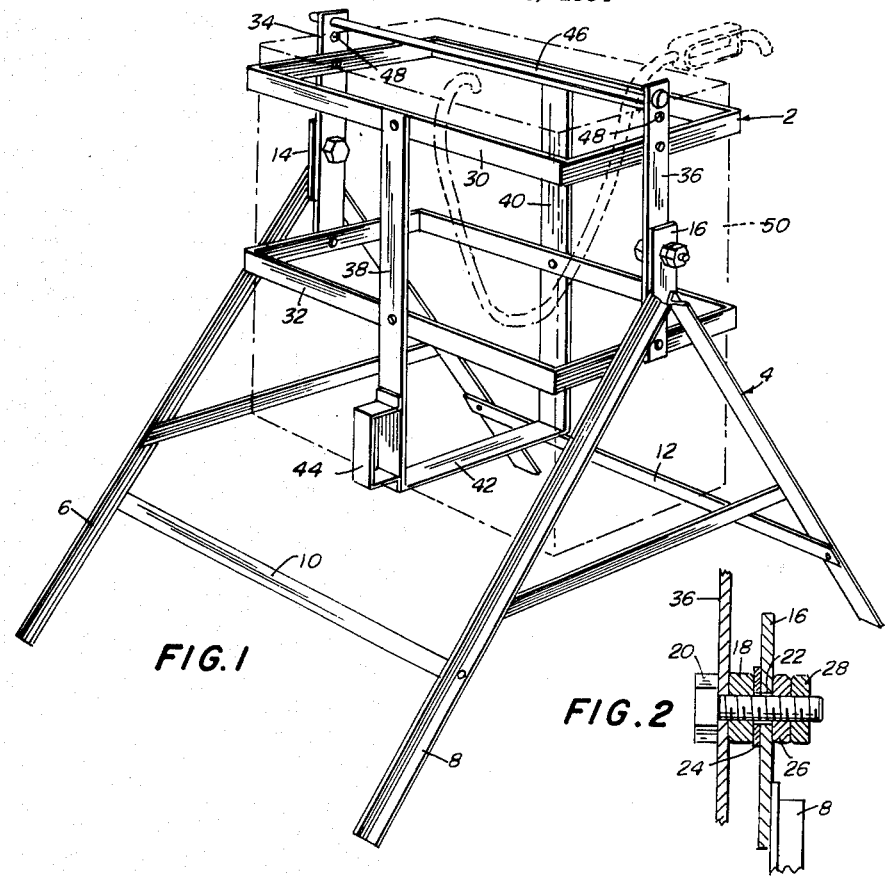
FIG.1
FIG.2
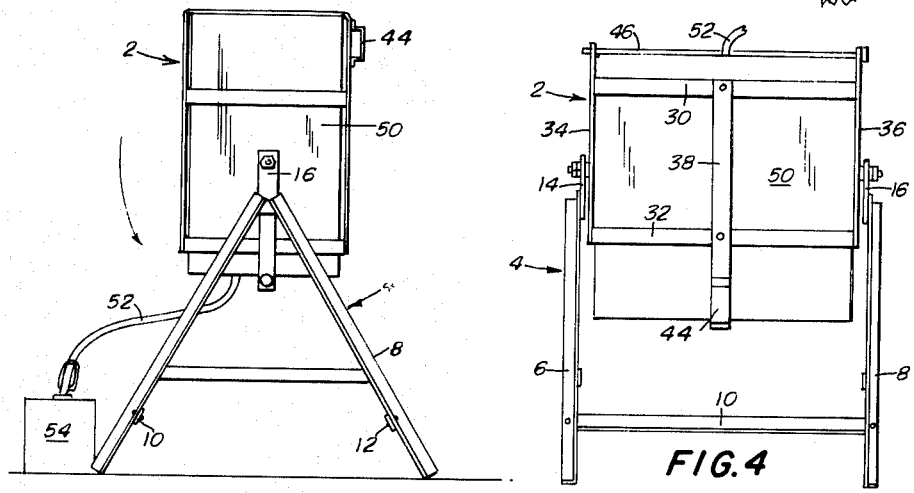
FIG.3
FIG.4
INVENTOR
CONLEY E. HOUSE
BY Beall and Jones
ATTORNEYS 3,236,483
TILTING SUPPORT
Conley E. House, % House Radiator Service,
Hazen, Ark.
Filed June 9, 1964, Ser. No. 373,639
5 Claims. (Cl. 248—140)

This invention relates to a cradle-like device for holding a container within a basket-like framework, which is capable of tilting so that the container contents may be emptied.

One particular field in which this invention may be used is for dispensing an electrolyte into storage batteries. Electrolyte is commonly furnished in corrugated boxes which are lined with plastic bags. A hose is generally attached to the container outlet for dispensing the electrolyte into batteries. Due to the weight and bulk of the containers, they are difficult to handle and cannot be easily tilted for dispensing their contents. This invention is a valuable assistance to those who are filling batteries in this manner. Of course, there are many other fields in which this invention may be used to facilitate the dispensing of contents from containers.

One object of this invention is to provide a cradle for tiltably supporting a container, which cradle is provided with friction means which limits the rotational freedom of the container-holding basket, so that the basket and the container will remain inverted.

Another object is to provide a basket structure having a relatively short handle conveniently located so that the basket may easily be shifted from an upright to an inverted position.

Still another object and feature of this invention is the provision of simple but effective means for holding a container within the basket when the container is inverted. This means includes a rod which is slidably fitted into suitable apertures in the basket and which remains at all times parallel to the axis about which the basket is rotated.

These and other objects are satisfied by the construction described below and shown in the accompanying drawings wherein FIG. 1 is a perspective view of the apparatus of the invention, with the basket in its upright position;

FIG. 2 is a detailed sectional view of the means for supporting the basket on the supporting framework;

FIG. 3 is a side elevation of the subject apparatus in which the basket is in its inverted position; and FIG. 4 is a front elevation of the apparatus of this invention, showing the basket in its upright position.

Referring to the drawing, and especially to FIG. 1, it will be seen that the basket 2 is tiltably supported on a supporting framework which is generally designated 4. The supporting framework includes a pair of A-frame support members 6 and 8 which lie in parallel vertical planes. These support members are held in spaced relationship by means of the basket assembly 2 and a pair of spacer bars 10 and 12.

Located at the upper end of the A-frame support members are plates 14 and 16. Each of these plates is provided with an aperture which supports the basket 2 for rotation about a horizontal axis.

The details of a suitable means for supporting the basket 2 from the framework is shown in FIG. 2. One of the vertical end bands 36 of the basket 2 is tightly held between a nut 18 and the head of a threaded bolt 20. The shank of the threaded bolt 20 serves as a threaded pivot rod which has its outer portion extending through and beyond the supporting aperture 22 in the plate member 16. An annular washer 24 may be placed between nut 18 and plate 16. On the outer portion of the pivot rod are a cooperating pair of lock nuts 26 and 28 which are tightened against plate 16 so that the side face of nut 26 will engage axially against the plate to limit the rotational freedom of the basket 2. Preferably, the means for supporting the basket from the framework 4 is identical on both sides of the basket. Of course, both pivot rods will be coaxial.

Returning to FIG. 1, it will be seen that the basket includes a pair of parallel continuous bands 30 and 32 which lie in parallel horizontal planes. These bands are connected to a series of vertical end bands 34 and 36, and vertical side legs 38 and 40. These vertical side legs are a portion of a U-shaped band located in a plane parallel to the planes of the A-frame members. The horizontal bottom leg 42 of the U-shaped band serves, of course, to hold the underside of the container when it is in its upright position.

To facilitate the inversion of the basket and the container therewithin, a relatively short handle 44 is attached to the vertical side leg 38 of the basket, proximate to the horizontal bottom leg 42. The desirability of this location of the handle may be seen by referring to FIG. 3 where it will be noted that the handle is in a convenient gripping position even when the basket is in its inverted position.

Means are provided for holding the container in the basket when the basket is inverted. This comprises a rod 46 which is slidably received in coaxial apertures in the vertical end bands 34 and 36. The rod must be of a length less than the distance between the spaced apart A-frame support members so that it may pass therebetween when the basket is inverted. Likewise, the rod must be parallel to the horizontal axis about which the basket tilts. Since it is possible that containers of various sizes may be used with this apparatus, an additional pair of coaxial apertures 48 may be provided.

When in use, a container 50 is placed in its upright position of the basket 2, as shown in FIG. 4. The rod 46 is then inserted into the end bands 34 and 36. The handle may then be gripped and the basket easily inverted to the position shown in FIG. 3. The particular means for mounting the basket, described above with respect to FIG. 2, will cause it to remain inverted so that the electrolyte may be dispensed through a hose 52 into the battery 50.

From the foregoing, it will be seen that a most useful device has been provided for tiltably supporting a container. Devices of this broad general type are, of course, well known in the art but they are not believed to have the features which satisfy the aforementioned objects of this invention.

Only one form of the invention has been shown and described. Various modifications thereto will occur to those working in the art. It is intended that this invention not be limited only to the sole embodiment shown, but to all the various modifications which fall within the scope of the following claims.

I claim:

1. A cradle for tiltably supporting a container, comprising,
   a pair of A-frame support members lying in parallel vertical planes,
   a basket for holding a container,
   said basket including a continuous band of fixed shape and dimensions located in a horizontal plane for encircling a container, and a U-shaped band with a horizontal bottom leg and vertical side legs, said side legs being attached to said continuous band and extending thereabove,
   said support members having means for supporting said basket for rotation about a horizontal axis,
   a rod slidably received by apertures in said side legs above said continuous band, said rod being parallel to said horizontal axis and adapted to retain a container in said within said continuous band when said basket is inverted.

2. A cradle for tiltably supporting a container, comprising,
- a pair of spaced apart A-frame support members lying in parallel vertical planes,
- each of said support members having a horizontal support aperture near its upper end,
- a basket having a series of parallel continuous bands of fixed shapes and dimensions in horizontal planes for holding side walls of a container,
- a series of vertical bands attached to said continuous bands to hold said continuous bands in spaced apart parallel relationship,
- a horizontal cross member attached to two of said vertical bands below said continuous bands for supporting a container bottom, said cross member being parallel to the planes of said A-frame support members,
- a pair of coaxial pivot rods extending outwardly from another two of said vertical bands at a level between said continuous bands,
- said another two bands having coaxial apertures located above said continuous bands, and
- a locking rod slidable through said coaxial apertures in said two bands to hold a package in said basket when said basket is inverted.

3. A cradle for tiltably supporting a container, comprising,
- a pair of spaced apart A-frame support members lying in parallel vertical planes,
- each of said support members having a horizontal support aperture near its upper end,
- a basket having a series of parallel continuous bands of fixed shapes and dimensions in horizontal planes for holding side walls of said container,
- a series of vertical bands attached to said continuous bands to hold said continuous bands in spaced apart parallel relationship,
- a horizontal cross member attached to said vertical bands below said continuous bands for supporting a container bottom, said cross member being parallel to the planes of said A-frame support members,
- a pair of threaded coaxial pivot rods extending outwardly from two of said vertical bands at a level between said continuous bands,
- each of said pivot rods having an outer portion extending through and beyond a said support aperture,
- a nut on said outer portion of one of said pivot rods to frictionally engage axially against one of said support members to limit rotational freedom of said basket,
- said two bands having coaxial apertures located above said continuous bands,
- a locking rod slidable through said coaxial apertures in said two bands to hold a package in said basket when said basket is inverted, and;
- a handle on one of said vertical bands and proximate to said horizontal cross member.

4. A cradle according to claim 1 having a handle member attached to one of said vertical side legs proximate to said horizontal bottom leg.

5. A cradle for tiltably supporting a container, comprising,
- a pair of spaced apart A-frame support members lying in parallel vertical planes, each of said support members having a horizontal support aperture near its upper end;
- a basket for supporting a container, said basket having a bottom formed only of a single horizontal cross member which is relatively narrow with respect to said basket, said cross member lying parallel to said parallel vertical planes;
- a first pair of vertical bands attached to and extending upward from the opposite ends of said horizontal cross member;
- a handle on one of said first pair of vertical bands and proximate to said horizontal cross member;
- a pair of parallel continuous bands of fixed shapes and dimensions in horizontal planes for holding side walls of said container, said continuous bands being attached to said first pair of vertical bands;
- a second pair of vertical bands attached to said continuous bands and located at opposite sides of said basket;
- each of said second pair of vertical bands having coaxial apertures located above said continuous bands;
- a locking rod slidable through said coaxial apertures to hold a package in said basket when said basket is inverted;
- a pair of coaxial pivot rods extending outwardly from each of said second pair of vertical bands intermediate said continuous bands, each of said pivot rods having an outer portion extending through and beyond a said support aperture in one of said A-frame support members.

References Cited by the Examiner

UNITED STATES PATENTS

| | | | |
|---|---|---|---|
| 430,562 | 6/1890 | Berry et al. | 248—139 X |
| 528,259 | 10/1894 | McKenzie | 248—142 |
| 1,335,796 | 4/1920 | Robinson | 248—141 X |
| 1,400,025 | 12/1921 | Carey | 248—141 |
| 1,474,212 | 11/1923 | Statham | 248—139 X |
| 1,708,579 | 4/1929 | Johnson | 248—141 X |
| 2,297,325 | 9/1942 | Ricker | 248—140 |
| 2,844,346 | 7/1958 | Six | 248—141 |
| 3,144,232 | 8/1964 | Smootz | 248—141 |

FOREIGN PATENTS 225,009 10/1927 Italy.

CLAUDE A. LE ROY, *Primary Examiner.*